United States Patent Office 3,380,846
Patented Apr. 30, 1968

3,380,846
MATTE SURFACE VITREOUS ENAMELS AND ARTICLES MADE THEREFROM
Robert S. Murray and Ray Andrews, Washington, Pa., assignors to B. F. Drakenfeld & Company, Inc., Washington, Pa., a corporation of New York
No Drawing. Filed May 27, 1965, Ser. No. 459,460
17 Claims. (Cl. 117—70)

This invention relates to low expansion vitreous enamels for application to borosilicate glasses and glass-ceramics, and more particularly it relates to vitreous enamels productive of matte surfaces.

For many years articles subject to thermal shock, such as cooking utensils and baking ware, have been made from borosilicate glasses the properties of which, such as low coefficient of linear expansion, are well known. More recently such articles have been made likewise from glass-ceramics, a term well known in the ceramic field. It has has reference to products likewise of low linear expansion originating as completely vitreous glasses of special composition made by conventional glass making procedures which are thereafter converted by heat treatment to a predominantly crystalline state. More in detail, a glass making batch is compounded to contain a nucleating agent together with constituents of inorganic compounds other than that agent, which constituents usually constitute the major portion of the glass as made but which can be crystallized from the glass by the nucleating agent. An appropriate heat treatment of the glass causes the said inorganic compounds to crystallize from the glass on nuclei of the nucleating agent. The result is a substantially crystalline product made up of a multitude of very small interlocked crystals of the crystalline phase or phases which are about 0.1 to 20 microns in diameter. This procedure and property of glass-ceramics are described in U.S. Patent 2,290,971 to S. D. Stookey, and in an article by him appearing in Industrial and Engineering Chemistry, vol. I, p. 805.

Although the surfaces of such products are glossy there may be a tendency for some foodstuffs to adhere to them, at least under some circumstances. It would therefore be desirable to take advantage of the remarkable anti-stick property of polytetrafluoroethylene (PTFE), to which virtually nothing will stick, as a liner or other working surface for utensils of the aforesaid type. PTFE would furthermore be advantageous for such use because of its great inertness to chemicals, because it is non-absorbent of water, and because it has extraordinarly low coefficient of friction. However, it is extremely diffcult to adhere to PTFE to other materials. The result is that there has been no fully satisfactory means to apply PTFE to borosilicate glasses and glass-ceramics even though there are specialized procedures that suffice to adhere it to some materials.

It is among the objects of this invention to provide a simple, inexpensive and highly effective method of adhering PTFE to borosilicate glasses and glass-ceramics, which for brevity will be referred to as borosilicate glasses.

A particular object is to provide vitreous enamel compositions of simple and inexpensive composition, which may be prepared by standard vitreous enamel practices, which are themselves of low linear expansion and are thus adapted for use with borosilicate glasses, and which when fused on such products form films of matte appearance and of roughness sufficient to provide a base for tightly and satisfactory bonding to PTFE.

Other objects will appear from the following specification.

The invention is predicated upon our discovery that its stated objects are attained by compositions consisting essentially of a mill addition of amorphous silica (fused quartz) to a low expansion enamel frit consisting essentially, on an oxide bases, of, by weight, about 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$. The composition is melted and water cracked in accordance with conventional vitreous enamel practices, and it is then ground, or ball milled, together with from about 2 percent to about 75 percent by weight of amorphous silica, depending on the coefficient of expansion desired, until the mixture of frit and silica passes a 325 mesh sieve (Tyler). The higher percentages of amorphous silica are preferred for use with glass-ceramics. Finally there is intimately mixed in about 10 weight percent more of minus 200, plus 325 mesh amorphous silica. In general these compositions exhibit coefficients of linear expansion of the order of $50 \times 10^{-7}/°$ C. to as little as about $7 \times 10^{-7}/°$ C. in the case of the higher proportions of amorphous silica. The 325 mesh material lowers the expansion of the flux while the 200 on 325 mesh material provides a rough surface which improves Teflon adherence.

It is critical to the attainment of the novel and unusual surface characteristics of films of these compostiions that the amorphous silica be present as a mill addition for if the silica is melted into the original flux batch the resultant frit will exhibit a coefficient of expansion so high as not to be compatible ("fit") with the expansion characteristics of borosilicate glasses, and the surface of the fused composition will not be that due to this invention.

The frit portion of the composition serves as a glass enamel which when melted bonds to the borosilicate glass substrate. At the same time it serves to fix the amorphous silica as part of the continuous enamel film. The amorphous silica thus acts to lower the expansion and as a roughing agent for adhering a later applied coating of PTFE.

Alkali metal oxides must be excluded from the constituents of the frit batch. Alumina in the amount stated is desirable, however, because it keeps the $B_2O_3$ from separating from solution with consequent adverse effect upon the expansion coefficient. The coloring pigments commonly used in glass enamel frits may be milled into the compositions of this invention but they are not considered an essential or functional ingredient.

The compositions of this invention may be applied in any of the various ways conventional in the art in the use of vitreous enamels, as by spraying, brushing, or rolling a slurry of them on the surface, after which the thus coated articles are passed through a lehr just as with ordinary vitreous enamels. These compositions mature at about 1150° to 1600° F. The result is a dead matte enamel film fused to the base carrying particles of amorphous silica. The film presents a matte appearance due to the presence in it of innumerable sharp-pointed silica particles which project from the surface of the film. This may account in part for the ability to lock a PTFE coating to such a film. These compositions are useful also for such other purposes as masking one face of articles such as traffic signs.

For many purposes we prefer that the frit comprise, by weight, 53.8 percent of PbO, 31.7 percent of $SiO_2$, 10.5 percent of $B_2O_3$, 3.3 percent of $Al_2O_3$, and 0.7 percent of ZrO. Such a frit intimately mixed with a mill addition of 25 to 30 weight percent of fused $SiO_2$ gives good results with borosilicate glass. In the case of glass-ceramics the proportions of $SiO_2$ to frit are desirably higher, and will range from 40 to 75 percent by weight.

The low coefficient of expansion amorphous silica forms a part of the continuous low expansion enamel film. We find that comparable results are to be had, however, by spraying a boro-silicate glass article with a slurry of the foregoing frits containing from 25 to 30 weight percent of amorphous silica and ground to 325 mesh, and before the coating has dried overspraying it with a light application of minus 200 mesh calcined alumina or semi-vitreous clay ware, such as wall tile, followed by firing. This provides the necessary multitude of fine sharp particles at the surface but because these particles constitute merely a surface deposit, not part of a continuous enamel film, it is unnecessary that they be of low expansion. Other non-vitrifiable, inelastic substances not decomposed by the molten frit may be used similarly.

Such enameled articles may be provided with the desired PTFE film or coating, by applying to the enamel film a primer followed by a slurry of PTFE in a water suspension, a practice that is used for adhering this resin to other materials but which does not suffice for borosilicate glasses and glass-ceramics alone or with other vitrifiable enamels lacking the amorphous silica mill addition which characterizes this invention.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A vitrifiable composition comprising a mechanical mixture of vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$, mechanically mixed with from 2 to 75 percent by weight of amorphous silica ground to pass a 325 mesh sieve.

2. A vitrifiable composition comprising a mechanical mixture of vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$, mechanically mixed with (1) from 2 to 75 percent by weight of amorphous silica ground to pass a 325 mesh screen, and (2) 10 percent by weight of amorphous silica ground to pass a 200 mesh screen but being retained on a 325 mesh sieve.

3. A composition according to claim 1 said frit consisting essentially of, by weight, 53.8 percent of PbO, 31.7 percent of $SiO_2$, 10.5 percent of $B_2O_3$, 3.3 percent of $Al_2O_3$, and from 0 to 2 percent of $ZrO_2$.

4. As a new article of manufacture, a glass article having fused on a surface thereof a coating of a vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$, mechanically mixed with from 2 to 75 percent of amorphous silica ground to pass a 325 mesh screen, and 10 weight percent of amorphous silica ground to passing a 200 mesh screen but being retained on a 325 mesh sieve.

5. An article according to claim 4, said frit consisting essentially of, by weight, 53.8 percent of PbO, 31.7 percent of $SiO_2$, 10.5 percent of $B_2O_3$, 3.3 percent of $Al_2O_3$, and 0.7 percent of $ZrO_2$.

6. As a new article of manufacture, a glass article having fused on a surface thereof a coating of a vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$, said frit being mechanically admixed with (1) from 2 to 75 percent of amorphous silica ground to pass a 325 mesh screen, and (2) 10 weight percent of amorphous silica ground to pass a 200 mesh screen but being retained on a 325 mesh screen, the exposed marginal layer of said coating having embedded therein a multiplicity of particles of an inorganic substance that is non-vitrifiable and stable against decomposition in contact with molten frit at 1600° F. and is in the form of inelastic 200 mesh particles.

7. An article according to claim 6, said substance being amorphous silica.

8. An article according to claim 6, said substance being calcined alumina.

9. An article according to claim 6, said substance being semivitreous clay ware.

10. That method of preparing a glass article to receive a surface coating of polytetrafluoroethylene comprising applying to a face of the article a layer of vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$ and mechanically mixed intimately with 2 to 75 percent by weight of amorphous silica ground to pass a 325 mesh sieve, and fusing the frit layer in place.

11. That method of preparing a glass article to receive a surface coating of polytetrafluoroethylene comprising applying to a face of the article a layer of vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and 0 to 2 percent of $ZrO_2$, mechanically mixed intimately with (1) 2 to 75 percent by weight of amorphous silica ground to pass a 325 mesh sieve and (2) 10 weight percent of amorphous silica ground to pass a 200 mesh sieve, and to be retained on a 325 mesh sieve, and fusing the frit layer in place.

12. That method of preparing a glass article to receive a surface coating of polytetrafluoroethylene comprising applying to a face of the article a layer of vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$ and mechanically mixed intimately with 2 to 75 percent by weight of amorphous silica ground to pass a 325 mesh sieve, applying to the exposed surface of said layer a thin coating of an inorganic substance that is non-vitrifiable and stable against decomposition in contact with molten frit at about 1150° to 1600° and is in the form of inelastic particles passing a 200 mesh sieve, and fusing the frit and said layer in place.

13. A method according to claim 12, said frit consisting essentially of, by weight, 53.8 percent of PbO, 31.7 percent of $SiO_2$, 10.5 percent of $B_2O_3$, 3.3 percent of $Al_2O_3$, and from 0 to 2 percent of $ZrO_2$.

14. A method according to claim 12, said substance being selected from the group consisting of amorphous silica, alumina, and vitreous clay ware in the form of particles passing a 200 mesh sieve.

15. As a new article of manufacture, a glass article having fused on one surface a coating of a mixture of (1) a vitrifiable glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$, and (2) from 2 to 75 percent of amorphous silica passing a 325 mesh sieve and 10 weight percent of amorphous silica passing a 200 mesh sieve, and retained on a 325 mesh sieve, and a layer of polytetrafluoroethylene adherently affixed to said coating.

16. An article, according to claim 15, the surface of said coating having embedded therein a multiplicity of particles of an inorganic substance that is non-vitrifiable and stable against decomposition in contact with molten frit at 1150° to 1600° F. and is in the form of inelastic particles passing a 200 mesh sieve.

17. As a new article of manufacture, a glass article having fused on one surface a coating of an intimate mixture of (1) a glass enamel frit consisting essentially of, by weight, 45 to 60 percent of PbO, 20 to 35 percent of $SiO_2$, 6 to 12 percent of $B_2O_3$, 1 to 5 percent of $Al_2O_3$, and from 0 to 2 percent of $ZrO_2$, and (2) from 2 to 75 percent of amorphous silica, passing a 350 mesh sieve, the surface of said coating carrying a thin layer of a substance selected from the group consisting of 200 mesh amorphous silica, alumina, and vitreous and semi-vitreous clay ware, and a layer of polytetrafluoroethylene adhered to said coating.

References Cited

UNITED STATES PATENTS

| | | | |
|---|---|---|---|
| 2,466,682 | 4/1949 | Bryant | 117—29 X |
| 2,467,114 | 4/1949 | Deyrup | 106—49 |
| 2,567,162 | 9/1951 | Sanders | 117—132 X |
| 2,642,364 | 6/1953 | Beatty et al. | 106—49 |

FOREIGN PATENTS

| | | |
|---|---|---|
| 622,338 | 3/1963 | Belgium. |
| 944,836 | 12/1963 | Great Britain. |
| 1,025,505 | 4/1966 | Great Britain. |
| 1,042,012 | 9/1966 | Great Britain. |

RALPH S. KENDALL, *Primary Examiner.*

UNITED STATES PATENT OFFICE
CERTIFICATE OF CORRECTION

Patent No. 3,380,846                  April 30, 1968

Robert S. Murray et al.

It is certified that error appears in the above identified patent and that said Letters Patent are hereby corrected as shown below:

In the heading to the printed specification, lines 5 and 6, "assignors to B. F. Drakenfeld & Company, Inc., Washington, Pa., a corporation of New York" should read -- assignors, by mesne assignments, to Hercules Incorporated, a corporation of Delaware --.

Signed and sealed this 14th day of October 1969.

(SEAL)
Attest:

Edward M. Fletcher, Jr.
Attesting Officer

WILLIAM E. SCHUYLER, JR.
Commissioner of Patents